US012728837B2

(12) United States Patent
Seno

(10) Patent No.: US 12,728,837 B2
(45) Date of Patent: Sep. 8, 2026

(54) PARKING ASSISTANCE APPARATUS AND PARKING ASSISTANCE METHOD

(71) Applicant: Panasonic Automotive Systems Co., Ltd., Kanagawa (JP)

(72) Inventor: Ryutaro Seno, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 18/664,765

(22) Filed: May 15, 2024

(65) Prior Publication Data

US 2024/0400039 A1 Dec. 5, 2024

(30) Foreign Application Priority Data

Jun. 1, 2023 (JP) ................................ 2023-091045

(51) Int. Cl.

| | |
|---|---|
| ***B60W 30/00*** | (2006.01) |
| ***B60W 30/06*** | (2006.01) |
| ***B60W 50/10*** | (2012.01) |
| ***B60W 50/14*** | (2020.01) |
| ***G08G 1/14*** | (2006.01) |

(52) U.S. Cl.

CPC ............ *B60W 30/06* (2013.01); *B60W 50/10* (2013.01); *B60W 50/14* (2013.01); *G08G 1/143* (2013.01); *B60W 2050/146* (2013.01); *B60W 2420/403* (2013.01); *B60W 2520/10* (2013.01); *B60W 2540/20* (2013.01)

(58) Field of Classification Search

CPC ...... B60W 30/06; B60W 50/10; B60W 50/14; B60W 2050/146; B60W 2420/403; B60W 2520/10; B60W 2540/20; G08G 1/143

See application file for complete search history.

(56) References Cited

U.S. PATENT DOCUMENTS

| | | | | |
|---|---|---|---|---|
| 11,472,401 | B2 * | 10/2022 | Muto | B60R 1/27 |
| 2010/0049401 | A1 | 2/2010 | Watanabe et al. | |
| 2014/0114529 | A1 * | 4/2014 | An | B60W 30/06 701/36 |
| 2015/0039173 | A1 * | 2/2015 | Beaurepaire | B60W 30/06 701/23 |
| 2017/0096167 | A1 * | 4/2017 | Yoon | B60R 1/27 |
| 2017/0132482 | A1 * | 5/2017 | Kim | B60R 1/27 |
| 2018/0022345 | A1 * | 1/2018 | Seo | B62D 15/027 701/2 |
| 2018/0043884 | A1 * | 2/2018 | Johnson | B60W 10/184 |
| 2018/0099661 | A1 * | 4/2018 | Bae | B60W 30/06 |
| 2018/0178780 | A1 * | 6/2018 | Hwang | B60W 10/20 |

(Continued)

FOREIGN PATENT DOCUMENTS

| | | |
|---|---|---|
| JP | 2008-201363 | 9/2008 |
| JP | 2022-069161 | 5/2022 |

*Primary Examiner* — Truc M Do

(74) *Attorney, Agent, or Firm* — Greenblum & Bernstein, P.L.C.

(57) ABSTRACT

A parking assistance apparatus includes: a processor; and a designated parking slot storage circuit that stores an area in a range based on a position away from a vehicle position by a preset distance as a designated parking slot corresponding to a parking instruction of an occupant, in which the processor detects a parking slot corresponding to the designated parking slot, and performs automatic parking of the vehicle based on information on the corresponding parking slot.

19 Claims, 8 Drawing Sheets

(56) References Cited

U.S. PATENT DOCUMENTS

| | | | | |
|---|---|---|---|---|
| 2018/0334189 | A1* | 11/2018 | Benmimoun | B62D 15/0285 |
| 2019/0351900 | A1* | 11/2019 | Matsuda | B62D 15/0285 |
| 2020/0101984 | A1* | 4/2020 | Takahashi | B60R 99/00 |
| 2020/0117926 | A1* | 4/2020 | Kim | G08G 1/143 |
| 2020/0148197 | A1* | 5/2020 | Yoon | H04W 4/44 |
| 2021/0323539 | A1* | 10/2021 | Muto | G08G 1/168 |
| 2022/0297676 | A1* | 9/2022 | Suzuki | B60W 60/005 |
| 2023/0254450 | A1 | 8/2023 | Michiguchi et al. | |

* cited by examiner

PARKING ASSISTANCE APPARATUS AND PARKING ASSISTANCE METHOD

TECHNICAL FIELD

The present disclosure relates to a parking assistance apparatus and a parking assistance method.

BACKGROUND ART

A parking assistance apparatus has been known that can perform automatic parking of a vehicle in a parking slot by steering the vehicle at a certain position in a region around the parking slot, and moving the vehicle backward from a position turned at a predetermined angle. For example, a conventional technique discloses a configuration of activating a parking assistance apparatus with a vehicle laterally set to a parking slot, and uniquely determining the parking position of the vehicle in the parking slot.

CITATION LIST

Patent Literature

PTL 1
JP 2022-69161 A

SUMMARY OF INVENTION

Technical Problem

Solution to Problem

A parking assistance apparatus according to the present disclosure includes:

- a processor that receives a parking instruction of an occupant by detecting that the occupant has performed a predetermined operation indicating designation of a parking position; and
- a designated parking slot storage circuit that stores as a designated parking slot at least one of right and left areas in a range based on a position away by a preset distance in a traveling direction from a vehicle position at a time when the processor receives the parking instruction, the designated parking slot corresponding to the parking instruction of the occupant, in which
- the processor
  - detects a parking slot corresponding to the designated parking slot stored in the designated parking slot storage circuit, based on a surrounding image indicating surroundings of a vehicle, and
  - performs, when detecting the corresponding parking slot, automatic parking of the vehicle based on information on the corresponding parking slot.

A parking assistance method according to the present disclosure is related to automatic parking of a vehicle, the parking assistance method including:

- receiving a parking instruction of an occupant by detecting that the occupant has performed a predetermined operation indicating designation of a parking position;
- storing as a designated parking slot at least one of right and left areas in a range based on a position away by a preset distance in a traveling direction from a vehicle position at a time of receiving the parking instruction, the designated parking slot corresponding to the parking instruction of the occupant;
- detecting a parking slot corresponding to the stored designated parking slot, based on a surrounding image indicating surroundings of a vehicle; and
- performing, when detecting the corresponding parking slot, automatic parking of the vehicle based on information on the corresponding parking slot.

Advantageous Effects of Invention

According to the present disclosure, automatic parking can be smoothly performed in a short time.

DESCRIPTION OF EMBODIMENTS

Embodiment

Figure 1:
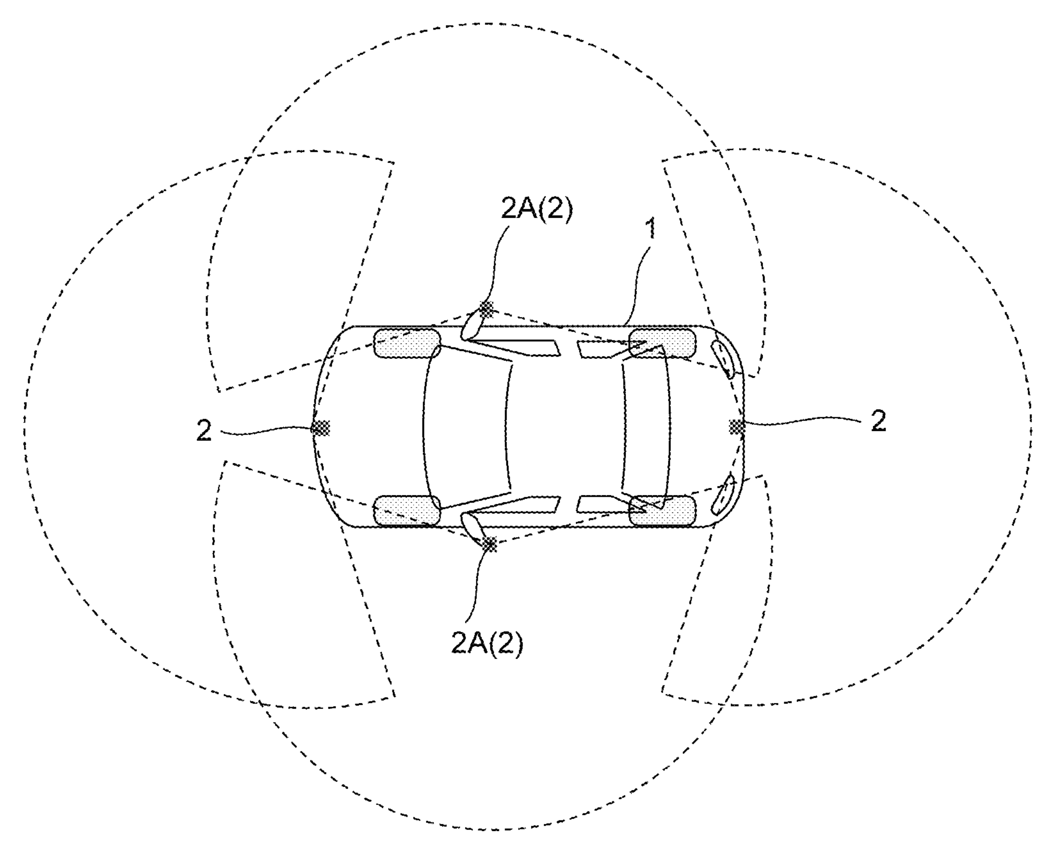
FIG. 1 illustrates a vehicle to which a parking assistance apparatus according to the present embodiment is applicable.

Hereinafter, an embodiment of the present disclosure will be described in detail based on the drawings. FIG. 1 illustrates vehicle 1 to which parking assistance apparatus 100 according to the present embodiment is applicable.

As illustrated in FIG. 1, vehicle 1 includes a parking assistance function for performing control related to automatic parking using surrounding images indicating the surroundings of vehicle 1. The parking assistance function is, for example, a function in which, after receiving the designation of a parking position from an occupant, vehicle 1 detects a parking slot corresponding to the position designated by the occupant and then generates a route based on the information on the corresponding parking slot to perform automatic parking.

Cameras 2 capable of capturing surrounding images are provided at four positions of front, rear, left, and right of the vehicle body of vehicle 1. Each camera 2 is equipped with a fisheye lens and has a visual field range of 180 degrees or more (see broken lines) in the horizontal direction. Each camera 2 is mounted with an angle of depression to capture a road surface, and thus, when a range in which the road surface is captured is converted into a visual field in the horizontal direction, one camera 2 captures a road surface in a range of approximately 240 degrees. For example, the images captured by side cameras 2A, which are provided on the right and left sides of the vehicle, include views of the front and rear wheels, and the side surface of the vehicle.

Figure 2:
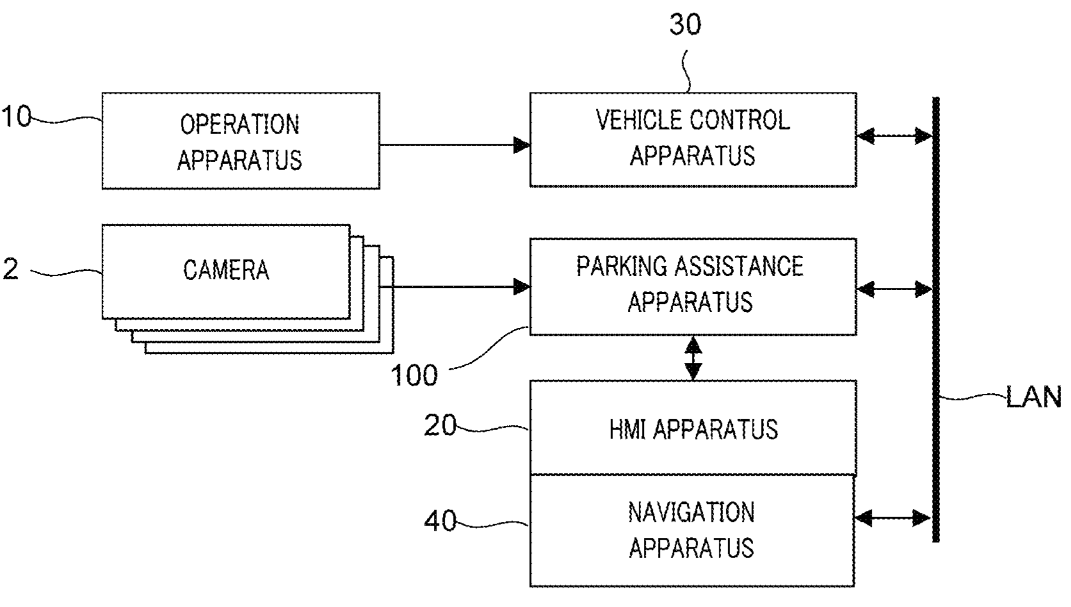
FIG. 2 illustrates a configuration on a network of a system to which the parking assistance apparatus is applied.

Further, as illustrated in FIG. 2, vehicle 1 includes, in addition to four cameras 2, operation apparatus 10, human-machine interface (HMI) apparatus 20, vehicle control apparatus 30, and parking assistance apparatus 100. Operation apparatus 10 is for manual operation by a driver (occupant), and includes a physical switch on a panel at a driver's seat, a software switch displayed on a touch panel, and equipment for driving operation such as a steering wheel, a pedal, and a gear. HMI apparatus 20 is, for example, used as an HMI for an occupant to input a command to parking assistance apparatus 100, such as a touch panel attached to navigation apparatus 40 provided to vehicle 1. The touch panel may be included in operation apparatus 10, or various switches grounded at the driver's seat may also be included in operation apparatus 10. Thus, operation apparatus 10 and HMI apparatus 20 may overlap with each other.

Vehicle control apparatus 30 includes a central processing unit (CPU), read only memory (ROM), random access memory (RAM), and an input/output circuit (not illustrated). When the occupant operates operation apparatus 10 such as a steering wheel or a pedal, vehicle control apparatus 30 receives the operation. In a normal driving mode, vehicle control apparatus 30 controls a steering angle and a vehicle speed by driving a motor (not illustrated) in accordance with information on the operation, and at the same time, outputs the information on the operation and the vehicle information such as the steering angle and the vehicle speed to the local area network (LAN, in-vehicle LAN or the like). When the mode changes to a parking assistance mode, vehicle control apparatus 30 receives instructions on the speed and the steering angle from parking assistance apparatus 100 through LAN, and controls the speed and the steering angle in accordance with the instructions.

Vehicle control apparatus 30 monitors the operation of operation apparatus 10, and thus parking assistance apparatus 100 acquires the operation information on operation apparatus 10 through LAN. The occupant can operate parking assistance apparatus 100 through HMI apparatus 20. Parking assistance apparatus 100 may receive position information on vehicle 1 outputted by navigation apparatus 40 through LAN, or may acquire the position information directly from navigation apparatus 40. Cameras 2 constantly output captured images to parking assistance apparatus 100, and parking assistance apparatus 100 generates and outputs a display image indicating the surroundings of the vehicle from the captured images even when parking assistance is not performed. Further, the above-described touch panel also functions as a display for outputting the display image generated by parking assistance apparatus 100, and thus parking assistance apparatus 100 and HMI apparatus 20 are directly connected to each other. Parking assistance apparatus 100 may directly receive information on the operation performed on the touch panel, or may receive the information through LAN. Further, parking assistance apparatus 100 can receive the position information on vehicle 1 outputted by navigation apparatus 40 through LAN.

Figure 3:
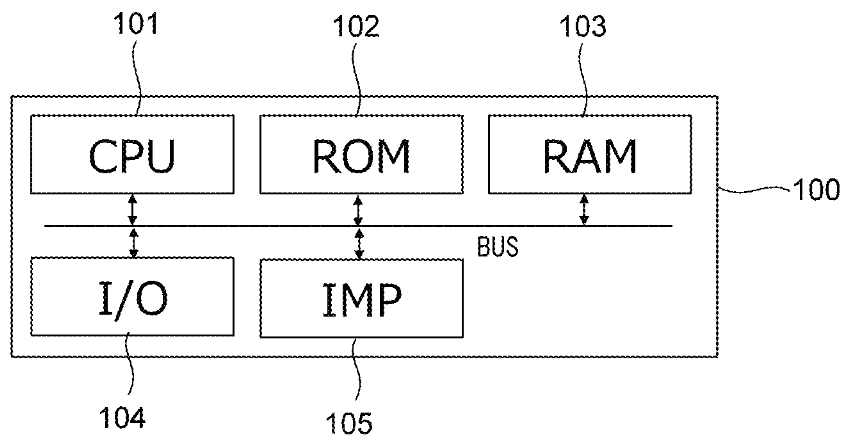
FIG. 3 is a block diagram illustrating hardware equipped with a function of the parking assistance apparatus.

The functions of parking assistance apparatus 100 may be implemented in the hardware illustrated in FIG. 3. Parking assistance apparatus 100 includes CPU 101, ROM 102, RAM 103, input/output interface (I/O) 104 and image processor (IMP) 105. Parking assistance apparatus 100 may be a computer that connects each element by a bus. Further, a plurality of elements may be accommodated in one chip, or one element may be composed of a plurality of chips. The bus may be a combination of a plurality of types of buses instead of a single bus. For example, CPU 101, ROM 102, RAM 103 and IMP 105 accommodated in one chip may be connected by a parallel bus, and I/O 104 composed of a plurality of chips may be connected by a serial bus to the chip accommodating CPU 101 and so forth.

CPU 101 controls the entire parking assistance apparatus 100. ROM 102, which is an electrically rewritable memory, functions as a non-volatile data storage area as well as storing programs to be executed by CPU 101, and retains data and the like even when parking assistance apparatus 100 is powered off. RAM 103 is used as a working area of CPU 101 for temporary storage. For example, data that only need to be stored temporarily, such as the most recent surrounding image, are stored in RAM 103. RAM 103 has a capacity capable of storing a plurality of surrounding images. IMP 105 is a processor that enhances processing performance by specializing in image processing, and executes processing of image acquirer 150, parking slot detector 160, and display image generator 190 illustrated in FIG. 4.

Figure 4:
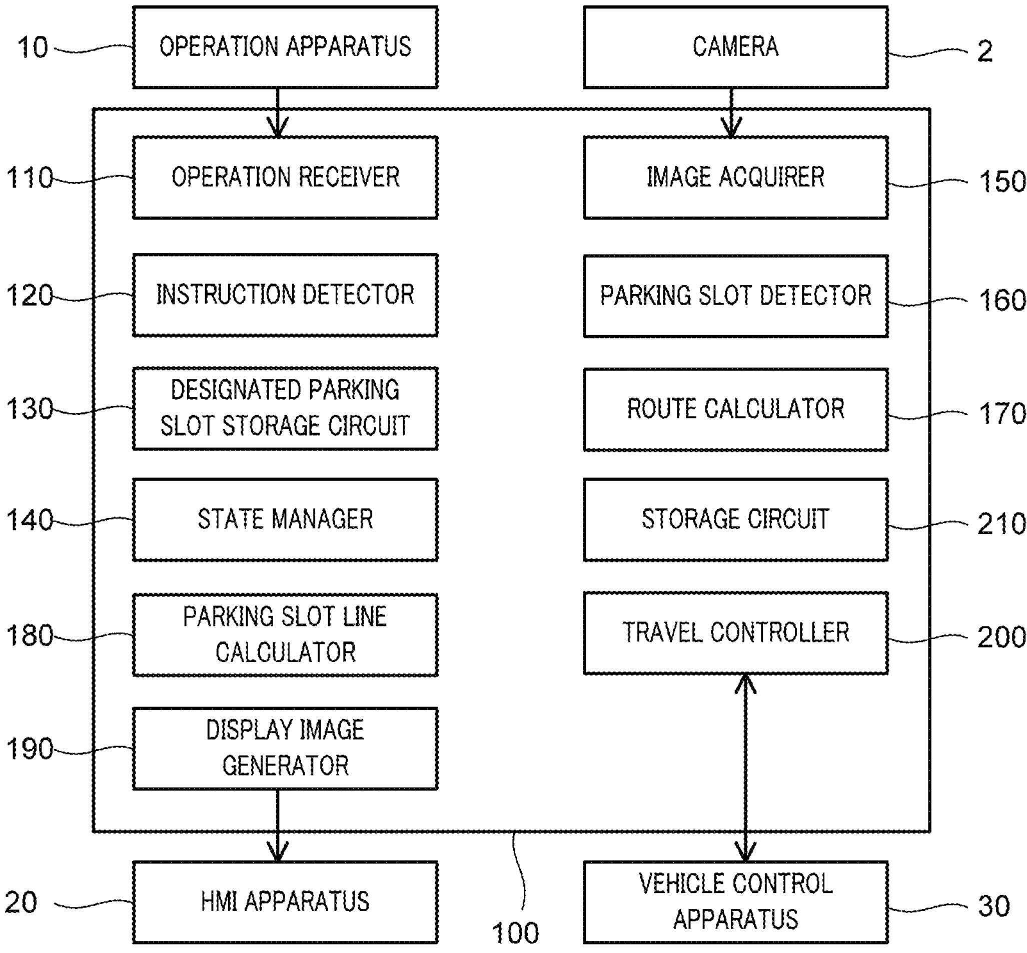
FIG. 4 is a block diagram illustrating the parking assistance apparatus.

Cameras 2 described above constantly output captured camera images to parking assistance apparatus 100. Parking assistance apparatus 100 generates and outputs a display image indicating the surroundings of vehicle 1 from the camera images even when the parking assistance is not performed. As illustrated in FIG. 4, parking assistance apparatus 100 includes operation receiver 110, instruction detector 120, designated parking slot storage circuit 130, state manager 140, image acquirer 150, parking slot detector 160, route calculator 170, parking slot line calculator 180, display image generator 190, travel controller 200, and storage circuit 210.

Operation receiver 110 receives operation information indicating an operation by the occupant including a driving operation. The operation by the occupant is not limited to the operation by the driver, and may include, for example, a button operation by a passenger other than the driver.

Instruction detector 120 detects that the occupant has performed a start operation indicating the start of parking assistance control. The start operation may be, for example, an operation of a switch for starting parking assistance in operation apparatus 10. Further, the start operation may be any operation as long as the operation is an operation of starting the parking assistance control through operation apparatus 10, such as a screen operation or a voice instruction. For example, when detecting a switch operation for starting parking assistance, instruction detector 120 determines that the detected operation is an instruction of starting the parking assistance. That is, instruction detector 120 starts an operation of instruction detection based on the operation of starting parking assistance by the occupant.

Note that parking assistance apparatus 100 may start the parking assistance control autonomously instead of by the operation by the occupant. For example, parking assistance apparatus 100 may determine the start of parking assistance based on the surrounding environment of vehicle 1 (e.g., line of vehicles, line of parking slots, and/or the like) or the state of vehicle 1 (e.g., vehicle speed is a predetermined speed (e.g., 10 km/h or less)). Further, the start operation by the occupant and the autonomous determination of the start of the parking assistance by parking assistance apparatus 100 may be combined.

Further, instruction detector 120 detects that a predetermined operation indicating the designation of a parking area (parking instruction) by the occupant has been performed. The predetermined operation indicating the designation of a parking area may be an operation of a direction indicator (winker lever). Instruction detector 120 receives a parking instruction by detecting an operation of a direction indicator by the occupant.

Note that the predetermined operation is not limited to the operation of a direction indicator. For example, the predetermined operation may be an operation of a hazard switch, an operation of a dedicated switch, a screen operation, a voice instruction, a steering operation, a pedal operation, or the like. Further, the predetermined operation may be an operation combining some of these operations (e.g., operation in which the occupant operates a direction indicator while operating a brake pedal).

Designated parking slot storage circuit 130 stores the position of an area designated by the occupant. Specifically, designated parking slot storage circuit 130 stores, as a designated parking slot, an area based on the position away from the vehicle position at the time when instruction detector 120 receives a parking instruction by a predetermined distance in the traveling direction of vehicle 1 (e.g., parking slot line to be described later). The designated parking slot indicates a range in which a parking slot expected by the occupant should be detected, and a parking slot detected within the designated parking slot may be sometimes referred to as a parking slot corresponding to the designated parking slot, but the designated parking slot does not necessarily refer to one parking slot, and refers to a range in which the occupant expects one or more parking slots to be detected. Further, the designated parking slot may be designated by a position (e.g., point at a specific distance in the traveling direction of the vehicle) and a direction starting from the position (e.g., right or left direction with respect to the traveling direction), and may be designated so as to specify one parking slot.

The area corresponding to the range based on the position away from the vehicle position by a predetermined distance may be, for example, a space (range of a parking slot) on at least one of both sides of a passage portion in front of vehicle 1 in the right and left direction in a position away from vehicle 1 by a predetermined distance. Specifically, the area may be a range of at least one of parking slots S on the right and left sides of parking slot line L (to be described later) in passage R in front of vehicle 1 (see FIG. 6).

The predetermined distance is a preset distance and can be set as appropriate. The predetermined distance may be, for example, a distance (e.g., 10 m or the like) at which the occupant can visually recognize the end portion of the line of the parking slot in front of vehicle 1 through the windshield of vehicle 1. Further, the predetermined distance may be a distance close to vehicle 1 to the extent that parking assistance apparatus 100 can immediately calculate a parking route for vehicle 1 to automatically park in the above-described parking slot whose end portion of line of the parking slot is visible, or may be a distance away from vehicle 1 to the extent that parking assistance apparatus 100 cannot calculate a parking route.

State manager 140 manages the state of the parking assistance depending on the operation information and/or the vehicle state. Further, state manager 140 manages a state (mode) related to the parking assistance. The state (mode) after the parking assistance control is started includes, for example, a standby mode, a parking slot detection mode, and an automatic parking mode.

The standby mode is a state after the parking assistance control is started and before a parking instruction is received from the occupant. The parking instruction includes an instruction on a position of a parking slot in which the occupant desires to park or an instruction on an area of a parking position, and thus is also referred to as parking slot designation. In the standby mode, a parking slot line to be described later is displayed, and when instruction detector 120 receives a parking instruction from the occupant, the state changes to the parking detection mode. Further, when the occupant performs an operation of cancelling parking assistance control during the standby mode, the parking assistance control may be ended.

The parking slot detection mode is a state in which parking assistance apparatus 100 executes detection of a parking slot in the area designated by the occupant. In the parking slot detection mode, parking assistance apparatus 100 detects a parking slot while the occupant performs an operation of driving vehicle 1, and when the parking slot is detected, the parking slot is displayed on HMI apparatus 20, and then the state changes to an automatic parking mode. Further, when no parking slot is detected in the area designated by the occupant during the parking slot detection mode, the state changes to the standby mode. Furthermore, when the occupant performs an operation of cancelling parking assistance control during the parking slot detection mode, the parking assistance control may be ended.

Note that, in the parking slot detection mode, parking assistance apparatus 100 may detect a parking slot in an automatic traveling state.

The automatic parking mode is a state in which a parking route is generated based on the position information on the parking slot detected by parking assistance apparatus 100, and the automatic parking is executed in accordance with the generated parking route. When the automatic parking is normally completed, the parking assistance control ends. Further, when the occupant performs an operation of cancelling parking assistance control during the automatic parking mode, the parking assistance control may be ended.

Image acquirer 150 acquires camera images and generates a surrounding image indicating the surroundings of vehicle 1. The surrounding image may be an overhead image that projects camera images onto a road surface, may be in a different format, or may remain as camera images.

Parking slot detector 160 sets a parking slot detection area for detecting a parking slot in the surrounding image, and extracts a white line from the surrounding image within the parking slot detection area. The parking slot detection area may be an area of the entire surrounding image, or may be an area in which a parking slot is expected in the surrounding image, that is, an area corresponding to the area designated by the occupant. Limiting the parking slot detection area to an area in which a parking slot is expected can shorten the processing time required for detection.

Parking slot detector 160 further generates extracted pairs of white lines and searches for a pair of white lines that matches the condition of the parking slot among the pairs of white lines. For example, parking slot detector 160 determines that the area interposed by two white lines is an area in which vehicle 1 can be parked (that is, parking slot) in the case that the following three conditions are satisfied when a pair of white lines is detected from the surrounding image: the two white lines are parallel to each other on a road surface; the two white lines are longer than the vehicle length; and the distance between the two white lines is longer than the vehicle width. In the case that a parking slot is detected, it can be said that the white lines constituting the parking slot are lines of the parking slot. In the case that there is a parked vehicle in a parking slot, at least one of lines of the parking slot is partially interrupted by a parked vehicle with respect to one camera, and thus a pair of white lines longer than the vehicle length is not detected. That is, it can be said that the detected parking slot is a parking slot in which there is no parked vehicle and a vehicle can be parked. Parking slot detector 160 outputs the corner points of the two lines of the parking slot, that is, the coordinates of four corners of the parking slot. The coordinates are relative coordinates with respect to the vehicle.

Further, parking slot detector 160 may set the area stored in designated parking slot storage circuit 130 as a detection range. That is, parking slot detector 160 performs parking slot detection within the area stored in designated parking slot storage circuit 130 based on the surrounding image of vehicle 1. This may also be referred to as detecting a parking slot corresponding to the designated parking slot.

Route calculator 170 sets a target parking position so that the center of the vehicle body is positioned at the center of coordinates of the four corners of the area available for parking outputted by parking slot detector 160, sets a target parking angle (direction of the vehicle body when parked in the target parking portion) so as to be parallel to the long side of the area available for parking, and then calculates the parking route to the target parking position. A proposed known method may be applied to the parking route calculation.

Parking slot line calculator 180 calculates a position of a parking slot line (display position on HMI apparatus 20) as a guide for the occupant to designate a desired parking position. The parking slot line is a line displayed on HMI apparatus 20 at a position corresponding to a passage part in front of vehicle 1 in a position a predetermined distance away from the vehicle position.

Note that the display position of the parking slot line may be set at a position where the distance to vehicle 1 is always the same (position corresponding to a predetermined distance set in advance), or may be differently set depending on the speed of vehicle 1, for example. That is, parking slot line calculator 180 (corrector) may correct the position of the parking slot line depending on the speed of vehicle 1. For example, in the case that the speed of vehicle 1 is faster than a predetermined speed, the display position of the parking slot line may be set farther than a predetermined distance, or in the case that the speed of vehicle 1 is slower than the predetermined speed, the display position of the parking slot line may be set closer than the predetermined distance. Further, the displayed position of the parking slot line depending on the speed of vehicle 1 may be changeable (switchable) depending on the preference of the occupant.

The width of the parking slot line (length in the traveling direction of vehicle 1) may be a width set in advance (predetermined width) or may vary depending on the speed of vehicle 1. For example, the width of the parking slot line may be set longer than a predetermined width in the case that the speed of vehicle 1 is faster than a predetermined speed, or may be set shorter than the predetermined width in the case that the speed of vehicle 1 is slower than the predetermined speed. Further, the width of the parking slot line depending on the speed of vehicle 1 may be changeable (switchable) depending on the preference of the occupant.

Further, the predetermined width may correspond to a parking slot in which one vehicle can be parked. That is, it may be configured that only one position can be specified as the position of the parking slot in which the occupant desires to park.

Further, the parking slot line may be displayed as a line passing through a specific position. In this case, a range at a preset distance with respect to a parking slot line may be a range of a parking instruction. For example, parking assistance apparatus 100 may set a range from the parking slot line to the position three meters distant as a range of a parking instruction. Further, parking assistance apparatus 100 may set a range two meters distant from the parking slot line in each of the front and rear directions as a range of a parking instruction.

Display image generator 190 generates a display image based on camera images or a surrounding image. The display image may be an overhead image in which the surroundings of vehicle 1 are viewed from above. That is, display image generator 190 may output the surrounding image as a display image.

Display image generator 190 superimposes and displays a message or a figure on the display image according to a request from state manager 140. For example, display image generator 190 may display the position of the parking slot detected by parking slot detector 160 by superimposing a semi-transparent quadrangle (such as a rectangle or square) on the overhead image, and may display a route from vehicle 1 to the target parking position calculated by route calculator 170 by a dotted line.

Further, display image generator 190 may read out a message by voice in addition to displaying the message on the image, or may only output a message by voice. Specifically, state manager 140 instructs display image generator 190 to select and output one of the preset texts. In response to this, display image generator 190 generates an image of a character string corresponding to the selected text, superimposes the generated image on the display image, outputs the superimposed image to HMI apparatus 20, and outputs audio data stored together with the text to HMI apparatus 20 along with the display image. This allows the occupant to recognize the message even when the occupant is not looking at HMI apparatus 20.

Display image generator 190 superimposes, in response to a request from state manager 140, a parking slot line on the display image as a guide for designating a parking position where the occupant desires to park.

The image displayed with a parking slot line being superimposed may be a display image based on camera images and/or a surrounding image, or may be an overhead view image. The shape of the parking slot line may be rectangular, trapezoidal, two lines, or the like. Further, display image generator 190 may display parking slots on the right and left sides corresponding to the parking slot line by superimposing a mark or the like on each of the right and left parking slots.

Travel controller 200 controls a steering angle and a vehicle speed so that vehicle 1 travels along the calculated parking route. More specifically, travel controller 200 outputs, to vehicle control apparatus 30, instruction values of a steering angle and a vehicle speed in accordance with the target values of the steering angle and the vehicle speed. Travel controller 200 calculates measured values of the steering angle and the vehicle speed based on the data outputted from vehicle control apparatus 30. For example, the measured value of the vehicle speed is calculated from the data on the rotational speed of the wheel and the data on the outer circumferential length of the wheel. The measured value of the steering angle may be data obtained from a steering device, or may be calculated from a turning radius differential calculated from the difference in the rotational speeds of the wheels. When there is a difference between the target value and the measured value, travel controller 200 corrects the instruction values of the steering angle and the vehicle speed so that the measured values of the steering angle and the vehicle speed are the same as the target values of the steering angle and the vehicle speed.

Travel controller 200 tracks the position and direction of travelling vehicle 1 based on the calculated measured values of the steering angle and the vehicle speed. That is, travel controller 200 calculates a traveling track of vehicle 1 during automatic traveling or manual traveling. The traveling track may be calculated in the form of movement information obtained by adding a movement distance, a movement direction, and the angle of a vehicle body to a time per unit time. The format of the movement information is not limited to the above, and may be, for example, a format using coordinate information.

During the automatic traveling, travel controller 200 compares the parking route calculated by route calculator 170 and the traveling track represented by the movement information together, and corrects the steering angle so that the traveling track follows the parking route. For example, when vehicle 1 travels while turning with a steering angle and the traveling track passes outside the parking route as viewed from the center point of the turn, travel controller 200 increases the steering angle to reduce the turning radius. This pulls the traveling track of vehicle 1 back toward the parking route.

Storage circuit 210 stores the operation information acquired by operation receiver 110, the movement information calculated by travel controller 200, the surrounding image generated by image acquirer 150, the position information on the lines of the parking slot and the parking slot detected by parking slot detector 160, and the like in the history information area in time-series order, associating these pieces of information with time. Since vehicle 1 moves in accordance with the operation by the occupant, one of the movement information and the operation information need not be stored in storage circuit 210, but in the present embodiment, both the movement information and the operation information are stored in storage circuit 210.

For example, storage circuit 210 may add information every unit time and fix the size of the storage area (memory block size) allocated to one addition. Then, the history information area is divided into memory blocks, and the head address of the information increases monotonically every unit time. Thus, a time is associated with the address where the information is stored. Alternatively, storage circuit 210 may separately provide a head address table in which the head addresses are associated with times without a memory size being fixed, and may update the head address table every time information is added.

Identifying a time in either way allows for access of the most current information at a given time. Further, accumulating the movement information up to the given time allows for identification of a relative positional relationship of the position at the given time with respect to the current position. Conversely, the position information may be added in time-series order as history information, and the relative positional relationship with respect to the current position may be identified from the difference between the position information at the given time and the current position. That is, the position information can be calculated from the history information.

Furthermore, for the data having a large size such as a surrounding image, only the head address may be stored in the history information area.

Since the history information only needs to be referred up to a certain period in time, the old history information that is no longer necessary may be deleted from storage circuit 210. For example, a history information area may be set as a fixed region interposed between the head and final addresses in storage circuit 210. It is preferred to configure the memory as a loop memory, so that when the address for storing information reaches the final address, the storage continues from the initial address. This eliminates the need for deletion processing, as the history information going back one loop is overwritten and deleted.

Further, storage circuit 210 stores the parking route calculated by route calculator 170, which allows travel controller 200 to refer to the parking route.

Figure 5:
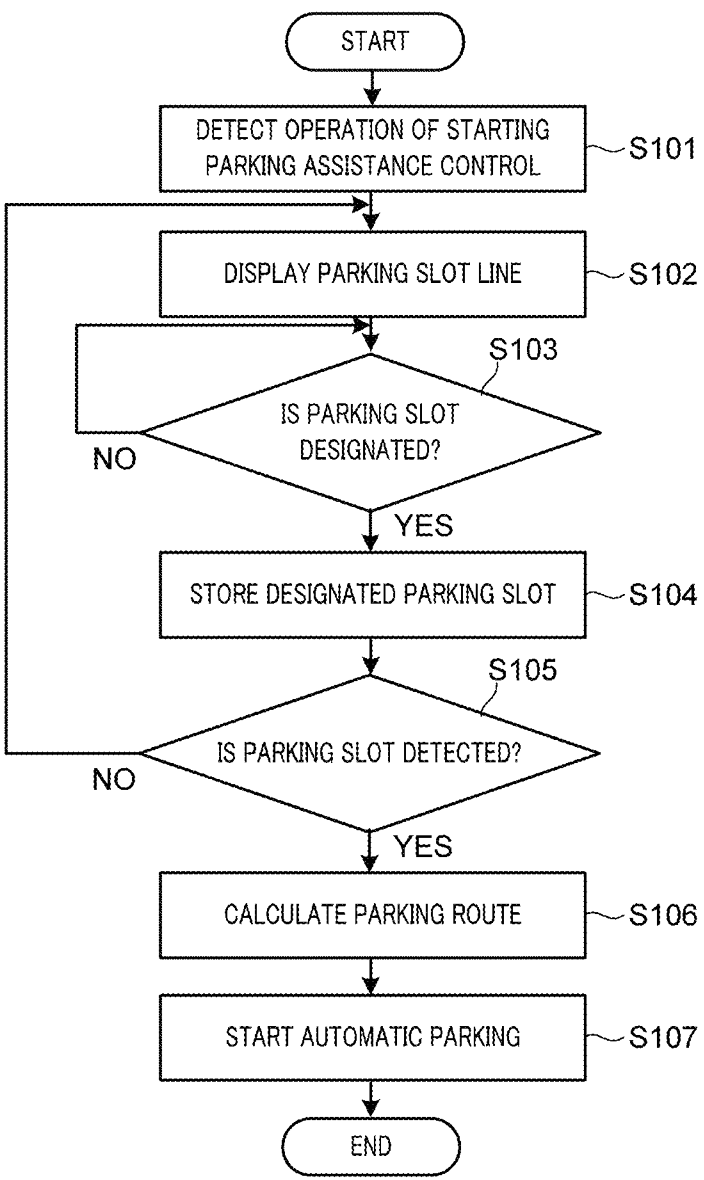
FIG. 5 is a flowchart illustrating an exemplary operation of parking assistance control in the parking assistance apparatus.

Next, the details of the parking assistance control according to the present embodiment is described. FIG. 5 is a flowchart illustrating exemplary operations of parking assistance control in parking assistance apparatus 100.

First, assume that the occupant performs a switch operation for starting parking assistance while vehicle 1 is traveling in a parking lot. In this case, parking assistance apparatus 100 detects an operation of starting parking assistance control (step S101). Then, parking assistance apparatus 100 displays a parking slot line on the display image of HMI apparatus 20 (step S102).

Figure 6:
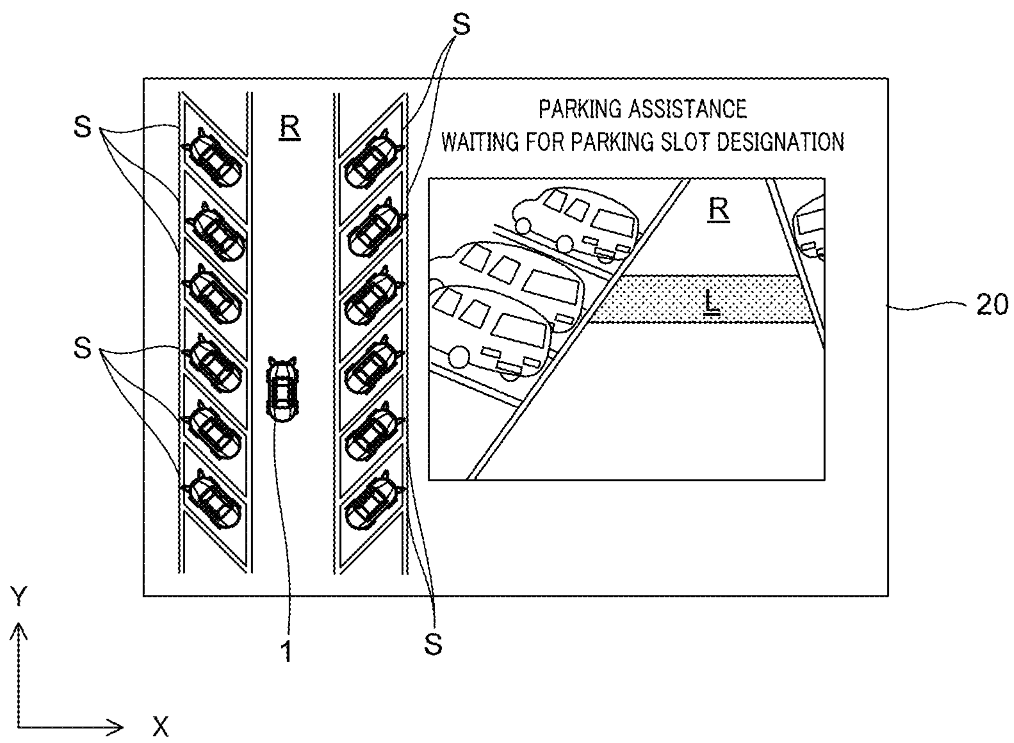
FIG. 6 illustrates exemplary display of an HMI apparatus during parking assistance control.

For example, as illustrated in FIG. 6, assume that there is a parking lot in which a plurality of parking slots S is aligned on both sides of passage R extending in the Y direction. Parking slots S are spaces located on both sides of passage R in the X direction perpendicular to the Y direction. In FIG. 6 and the like, parking slot S is exemplified as a space where vehicle 1 can be parked along a direction that tilts towards the + side in the Y direction as the vehicle moves towards the + or − side in the X direction. Further, FIG. 6 and the like each exemplify a display image of HMI apparatus 20. Specifically, HMI apparatus 20 may display a surrounding image of a vehicle showing the front of vehicle 1 (image on the right side in FIG. 6) together with an overhead view image (image on the left side in FIG. 6).

When the occupant performs a switch operation of starting parking assistance while vehicle 1 is travelling passage R toward the + side in the Y direction in this parking lot, the state managed by state manager 140 changes to a standby mode, and parking slot line L is superimposed and displayed on the display image of HMI apparatus 20. Parking slot line L is displayed at a position away from the − side (front side) of vehicle 1 in the Y direction by a distance corresponding to three parking slots S.

When vehicle 1 moves forward, parking slot line L does not move, but the vehicle surrounding image moves as the vehicle moves forward, and thus parking slot line L moves relative to the surrounding image of the vehicle. The occupant drives vehicle 1 while visually recognizing the positional relationship between the image on which parking slot line L is projected by HUD and parking slot S where the vehicle is desired to be parked through a windshield, or while visually recognizing the positional relationship between parking slot line L superimposed on the vehicle surrounding image shown on HMI apparatus 20 and parking slot S where the vehicle is desired to be parked.

Then, when the position of desired parking slot S (parking slot without a parking vehicle) in the Y direction and the position of parking slot line L in the Y direction overlap with each other on HMI apparatus 20, the occupant operates a direction indicator to give a parking instruction. In this case, because the parking instruction designates one parking slot, performing a parking instruction operation may also be referred to as designating a parking slot. In the example of FIG. 6, for example, when the occupant designates a parking slot with no parking vehicle on the – side of passage R in the X direction, the direction indicator may be operated in a direction in which vehicle 1 turns toward the – side of vehicle 1 in the X direction.

After step S102, parking assistance apparatus 100 determines whether or not the parking slot has been designated (step S103), and when the occupant has operated the parking instruction as described above, parking assistance apparatus 100 determines that the parking slot has been designated (Yes in step S103). When receiving no operation of parking instruction by the occupant, parking assistance apparatus 100 determines that the parking slot is not designated (NO in step S103), and the process of step S103 may be repeated.

Figure 7:
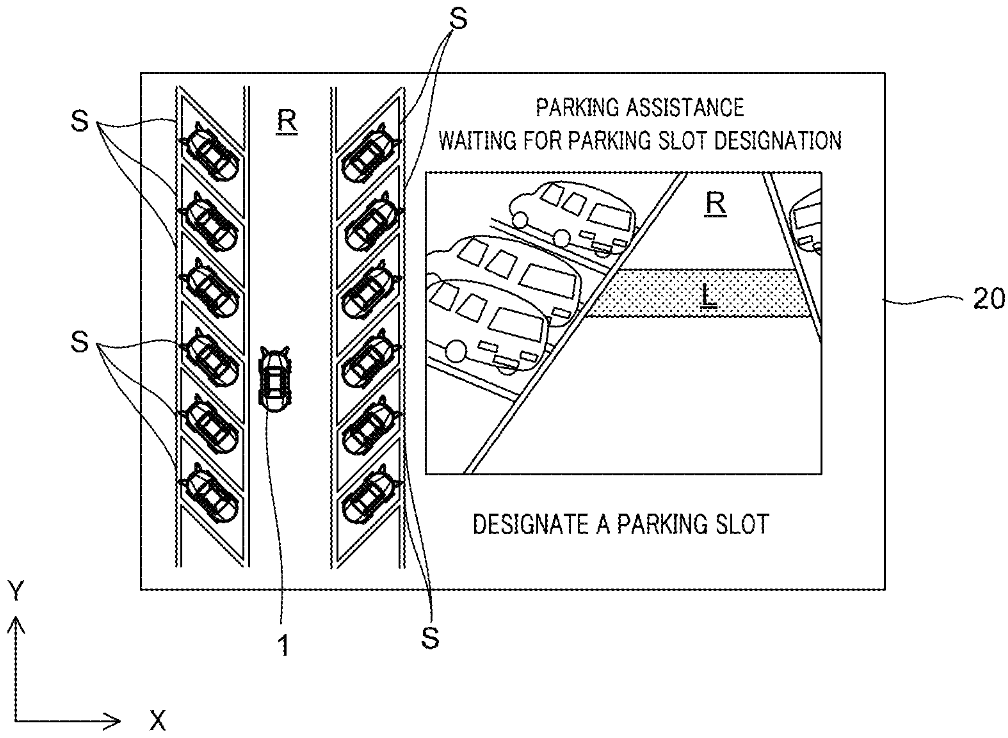
FIG. 7 illustrates another exemplary display of the HMI apparatus during parking assistance control.

Note that, in the standby mode, HMI apparatus 20 may display or output an instruction for slowly moving vehicle 1, instruction for overlapping parking slot line L with parking slot S, and instruction for prompting an operation of designating a parking slot (operation of a direction indicator or the like). FIG. 7 illustrates an example in which the instruction “Designate a parking slot” is indicated to prompt an operation of designating a parking slot. At this time, parking slot line Lis superimposed on the display image of HMI apparatus 20. Parking slot line L may be projected on a windshield by HUD. When vehicle 1 moves forward, parking slot line L does not move, but an image showing the front of the vehicle or a real image in front of the vehicle moves, and the relative position with respect to parking slot line L changes accordingly. The occupant gives a parking instruction when a desired position overlaps with parking slot line L, so that the occupant can designate the desired position as a parking position.

Then, when it is determined that a parking slot has been designated (YES in step S103), parking assistance apparatus 100 stores the position of the designated parking slot, that is, the position indicated by parking slot line L at the time when the parking instruction is given, in designated parking slot storage circuit 130 as a designated parking slot (step S104). In this case, the designated parking slot may be stored as information on a position of one point (a distance to parking slot line L at the time when the parking instruction is given) and a direction (right or left) starting from the position. Then, the state managed by state manager 140 changes from the standby mode to a parking slot detection mode, and parking assistance apparatus 100 determines whether or not a parking slot corresponding to the designated parking slot has been detected (step S105). At this time, designated parking slot line L2 indicating the position of the designated parking slot stored by parking assistance apparatus 100 is superimposed on the display image of HMI apparatus 20. Designated parking slot line L2 moves on the display image as vehicle 1 moves forward. The occupant confirms whether or not the desired position has been designated by confirming this parking slot line L2.

After performing the operation of the parking instruction, the occupant continues the operation of driving vehicle 1, and move vehicle 1 closer to the designated parking slot. During this time, parking assistance apparatus 100 detects a parking slot within an area corresponding to the designated parking slot based on image information of camera 2.

Figure 8:
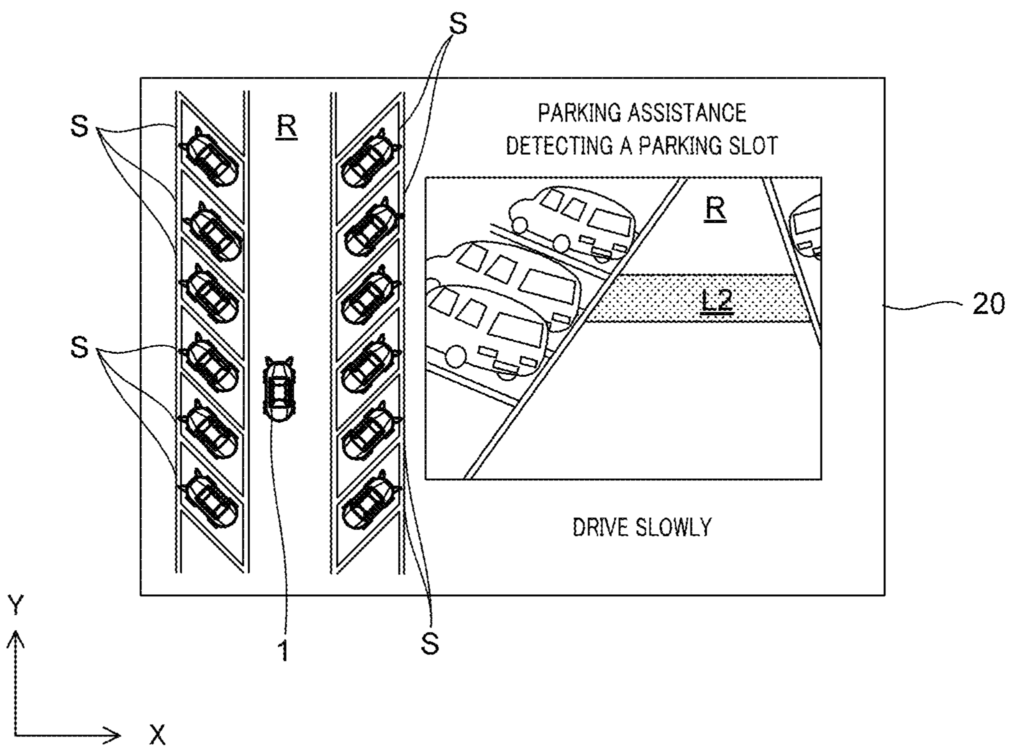
FIG. 8 illustrates still another exemplary display of the HMI apparatus during parking assistance control.

Note that, in the parking slot detection mode, HMI apparatus 20 may display or output voice of an instruction for reducing the traveling speed of vehicle 1 to equal to or slower than a certain speed (such as a speed at which parking slot detection can be performed) and/or a notification to inform whether the occupant has specified the parking slot on the right or left side (e.g., that the parking slot on the left side has been specified, or the like). FIG. 8 illustrates an example in which an instruction for reducing the traveling speed of vehicle 1 to equal to or slower than a certain speed is given.

When vehicle 1 reaches an area in which a parking slot can be detected, a parking slot is detected by parking slot detector 160 and displayed on HMI apparatus 20. At this time, parking assistance apparatus 100 determines that a parking slot corresponding to the designated parking slot has been detected (YES in step S105). At this time, route calculator 170 calculates a parking route for the detected parking slot, and when there is no valid parking route, parking assistance apparatus 100 disables the detection of the parking slot and does not display that the parking slot has been detected, on HMI apparatus 20.

Figure 9:
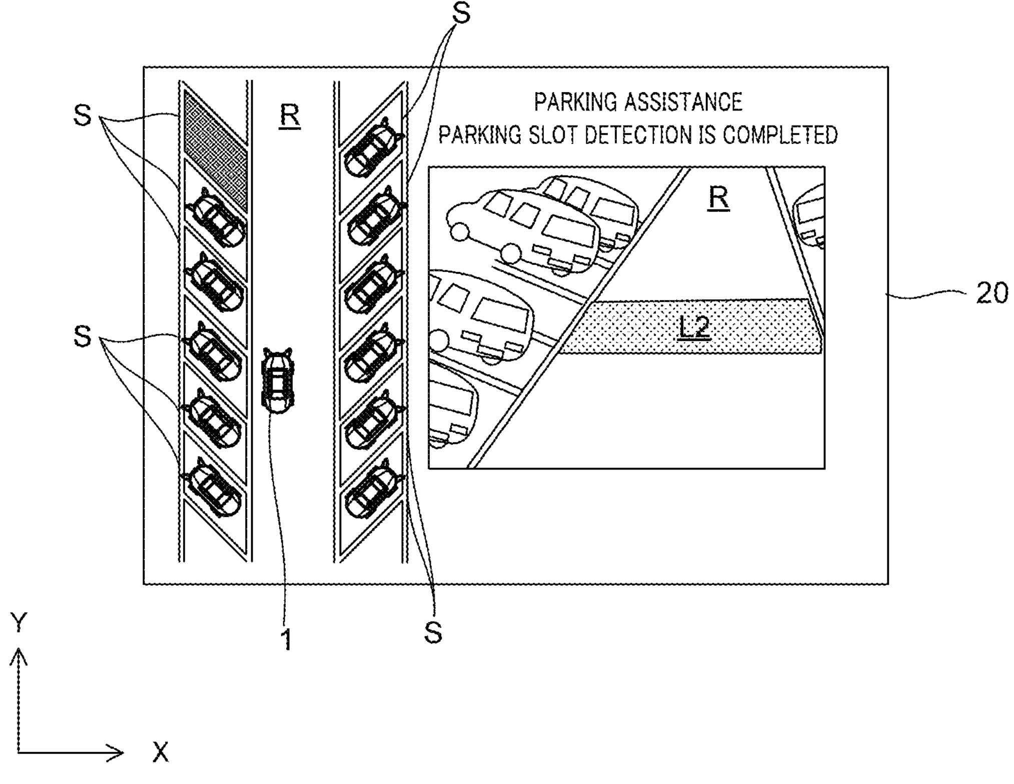
FIG. 9 illustrates still another exemplary display of the HMI apparatus during parking assistance control.

Note that HMI apparatus 20 may display so that the occupant can know which parking slot is the corresponding parking slot (parking slot as a target for parking) when the corresponding parking slot is detected. FIG. 9 illustrates an example in which the color of the parking slot in which the vehicle is about to be parked, that is, the corresponding parking slot is changed to be distinguished from the other parking slots in the overhead view image.

Figure 10:
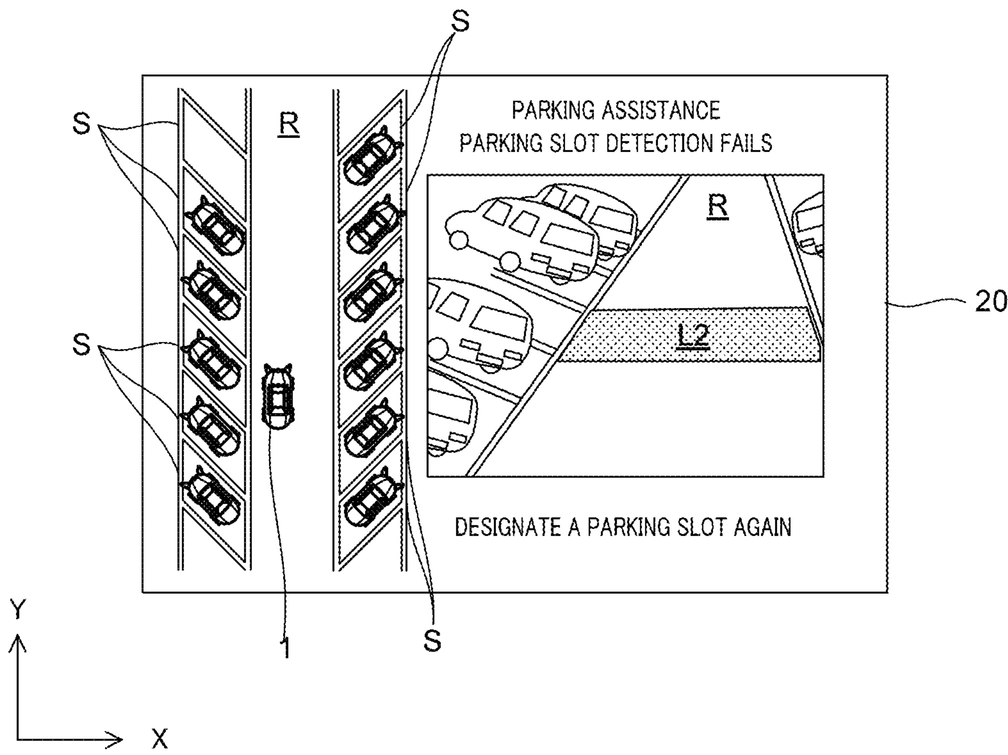
FIG. 10 illustrates still another exemplary display of the HMI apparatus during parking assistance control.

Further, in the case that parking slot detector 160 detects no parking slot corresponding to the designated parking slot even though vehicle 1 reaches an area in which a parking slot is detectable (NO in step S105), parking assistance apparatus 100 may change the mode from the parking slot detection mode to the standby mode. That is, the process may return to the process of step S102 after determination as NO in step S105. Further, in this case, HMI apparatus 20 may display or output voice of a notification that parking in the designated parking slot is impossible, and/or an instruction for prompting the occupant to give a parking instruction again. FIG. 10 illustrates an example in which the instruction “Designate a parking slot again” is indicated to prompt the occupant to designate a parking slot again. When designated parking slot L2 is displayed farther, the parking slot is possibly invisible, and thus the occupant may be prompted to designate a parking position.

Note that, until vehicle 1 reaches the area in which the parking slot can be detected by parking slot detector 160, parking assistance apparatus 100 may repeat the process of step S105 while determining that a parking slot corresponding to the designated parking slot is not detected.

Then, the state managed by state manager 140 changes from the parking slot detection mode to an automatic parking mode, and parking assistance apparatus 100 calculates a parking route by route calculator 170 (step S106) and starts automatic parking (step S107).

Figure 11:
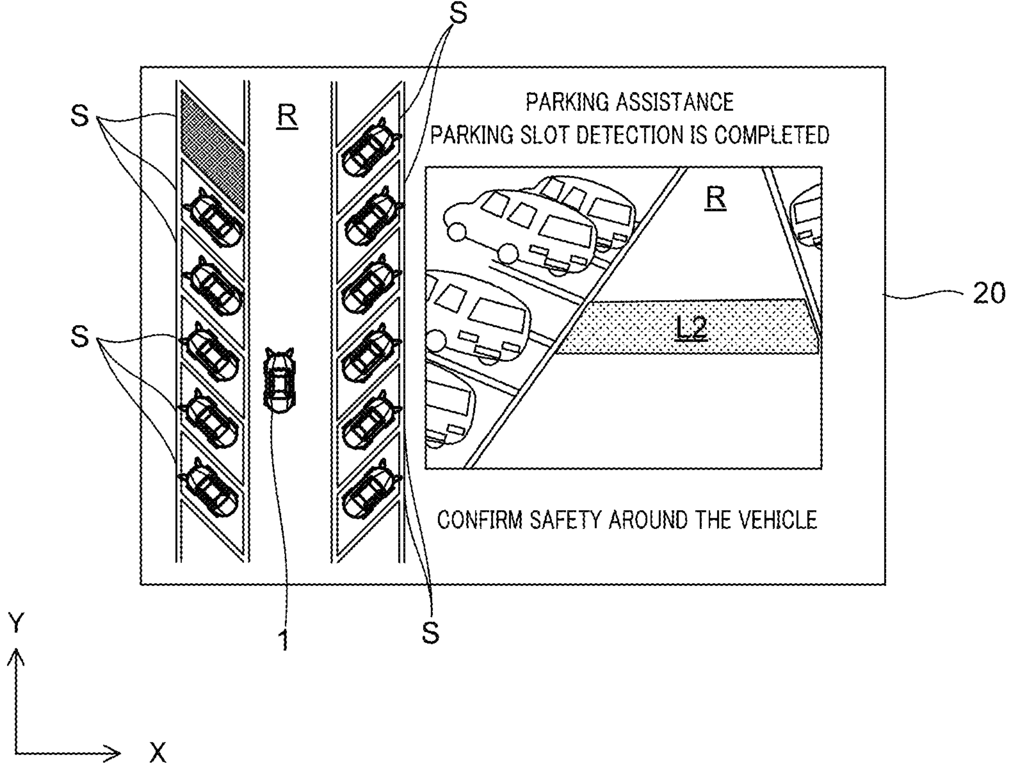
FIG. 11 illustrates still another exemplary display of the HMI apparatus during parking assistance control.

Note that, when the automatic parking is started, HMI apparatus 20 may display or output voice of a notification that the automatic parking is started, an instruction for confirming safety around the vehicle, an instruction for stopping operating a steering wheel, or the like. FIG. 11 illustrates an example in which the instruction “Confirm safety around the vehicle” to confirm safety around the vehicle is given.

After the automatic parking is completed, the control ends.

Figure 12:
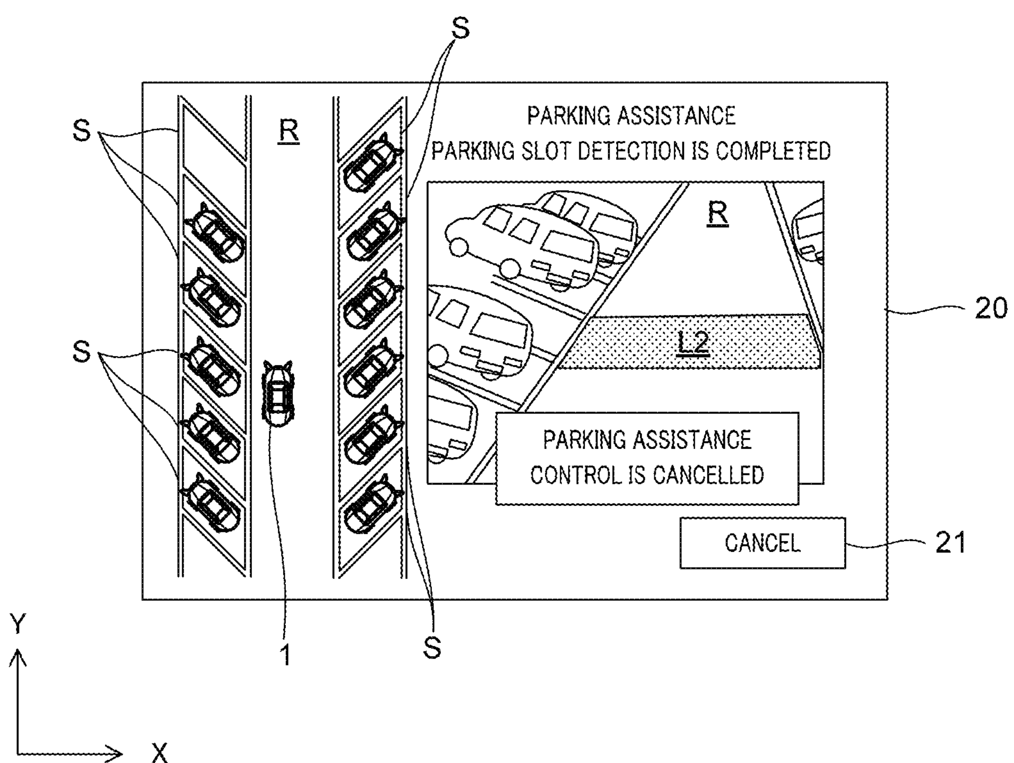
FIG. 12 illustrates still another exemplary display of the HMI apparatus during parking assistance control.

There is possibly a case where parking of vehicle 1 is interfered, such as the case that there is an obstacle, or that the vehicle parked in the next parking slot to the designated parking slot sticks out, and thus it may be configured to enable the occupant to cancel the automatic parking during the parking assistance control. That is, in the parking slot detection mode and the automatic parking mode, parking assistance apparatus 100 may end the control when an operation of canceling the parking slot designated by the occupant is performed. FIG. 12 illustrates an example in which operation button 21 for cancelling parking assistance control is displayed on HMI apparatus 20.

Further, in this case, HMI apparatus 20 may display or output voice of a notification that parking in the designated parking slot has been cancelled, and/or an instruction for designating a parking slot again. FIG. 12 illustrates an example in which a notification "Designation of a parking slot is cancelled" is indicated to inform that the designated parking slot has been cancelled. The designated parking slot in this case refers to a parking slot corresponding to the designated position.

Further, after the cancellation operation is performed, parking assistance apparatus 100 may delete the designated parking slot stored in designated parking slot storage circuit 130 and set the state managed by state manager 140 to the standby mode. Furthermore, in the automatic parking mode, when the cancellation operation is performed, vehicle 1 may be returned to the position at the time when the automatic parking is started by the automatic control, and then, the state managed by state manager 140 may be changed to the standby mode.

According to the present embodiment configured as described above, a parking instruction (parking slot designation) by the occupant is detected at a specific distance (predetermined distance) before the parking slot in which the occupant desires to park vehicle 1 while driving vehicle 1, and then a parking slot corresponding to the instruction is detected.

Thus, the process performed after the occupant brings (stops) a car alongside the parking slot in which the occupant desires to park in the conventional technique, such as a parking instruction, can be performed while vehicle 1 is traveling in the present embodiment. As a result, travelling operated by an occupant can be easily changed to traveling by automatic parking.

Further, it is possible to start automatic parking with parking assistance apparatus 100 recognizing the position of a parking slot in advance when vehicle 1 travels toward the parking slot where the occupant desires to park. Consequently, a parking instruction operation and recognition of a parking slot are completed by the time when vehicle 1 reaches the vicinity of the parking slot, which can greatly shorten the time from when vehicle 1 reaches in front of the parking slot until when the parking is completed, compared to the conventional technique in which recognition of a parking slot and automatic parking are performed after the occupant stops the vehicle and gives a parking instruction. That is, in the present embodiment, automatic parking can be smoothly performed in a short time.

Further, the area corresponding to the range based on the position that is a predetermined distance away from the vehicle position at the time when the parking instruction is received is set as a range for parking slot detection, so that the range for parking slot detection can be narrowed down to that area. Consequently, the processing time can be shortened.

Furthermore, displaying a parking slot line through HMI apparatus 20 allows the occupant to visually recognize the above-described area. This can improve the ease of designating a parking slot for the occupant.

In addition, the designation of a parking slot can be performed by the operation of a direction indicator, which eliminates the need of providing a dedicated operation device. This can simplify the configuration.

Note that, in the present embodiment, when no parking slot is detected at a position designated by the occupant, the mode changes to the standby mode to designate a parking slot again, but the present disclosure is not limited thereto.

For example, when parking assistance apparatus 100 determines NO in step S105 of the flowchart illustrated in FIG. 5, state manager 140 may determine whether to end the parking assistance control depending on the number of times the parking instruction is received after the operation of instruction detection is started. Specifically, state manager 140 may determine to end the parking assistance control when the number of times the parking instruction is received exceeds a predetermined number of times (e.g., the preset number of times such as one).

This makes it possible to limit the number of times of the reception of the parking instruction in the parking assistance control. For example, in a configuration in which parking designation is performed by a direction indicator, the direction indicator is possibly operated repeatedly when a parking slot is continuously not detected. Since the direction indicator is also operated when the vehicle turns right or left, an operation based on a parking instruction and an operation performed when the vehicle turns right or left are possibly confused with each other. For this point, limiting the number of times the parking instruction is received can suppress the occurrence of the above confusion.

Further, for example, state manager 140 may determine whether to end the parking assistance control depending on the travel distance of vehicle 1 after the operation of instruction detection is started. Specifically, state manager 140 may determine to end the parking assistance control when the travel distance of vehicle 1 after the parking assistance control is started exceeds a predetermined distance (preset travel distance, e.g., 30 m).

This makes it possible to limit the travel distance in the parking assistance control. For example, in a configuration in which a parking instruction is performed by a direction indicator as described above, an operation based on a parking instruction and an operation when the vehicle turns right or left are possibly confused with each other. For this point, limiting the travel distance in the parking assistance control can suppress the occurrence of the above confusion.

Further, for example, state manager 140 may determine whether to end the parking assistance control depending on the elapsed time after the operation of the instruction detection is started. Specifically, state manager 140 may determine to end the parking assistance control when the elapsed time after the parking assistance control is started exceeds a predetermined time (preset time).

This makes it possible to limit the operation time in the parking assistance control. For example, in a configuration in which a parking instruction is performed by a direction indicator as described above, an operation based on a parking instruction and an operation when the vehicle turns right or left are possibly confused with each other. For this point, limiting the operation time of the parking assistance control can suppress the occurrence of the above confusion.

Further, state manager 140 may determine whether to end the parking assistance control depending on any one of the number of times the parking instruction is received, the travel distance of vehicle 1 after the parking assistance control is started, and the elapsed time of the parking assistance control.

Further, in the above-described embodiment, the width of the parking slot line is a width corresponding to one parking slot, but the present disclosure is not limited thereto, and the width may be a width corresponding to a plurality of parking slots, for example.

Figure 13:
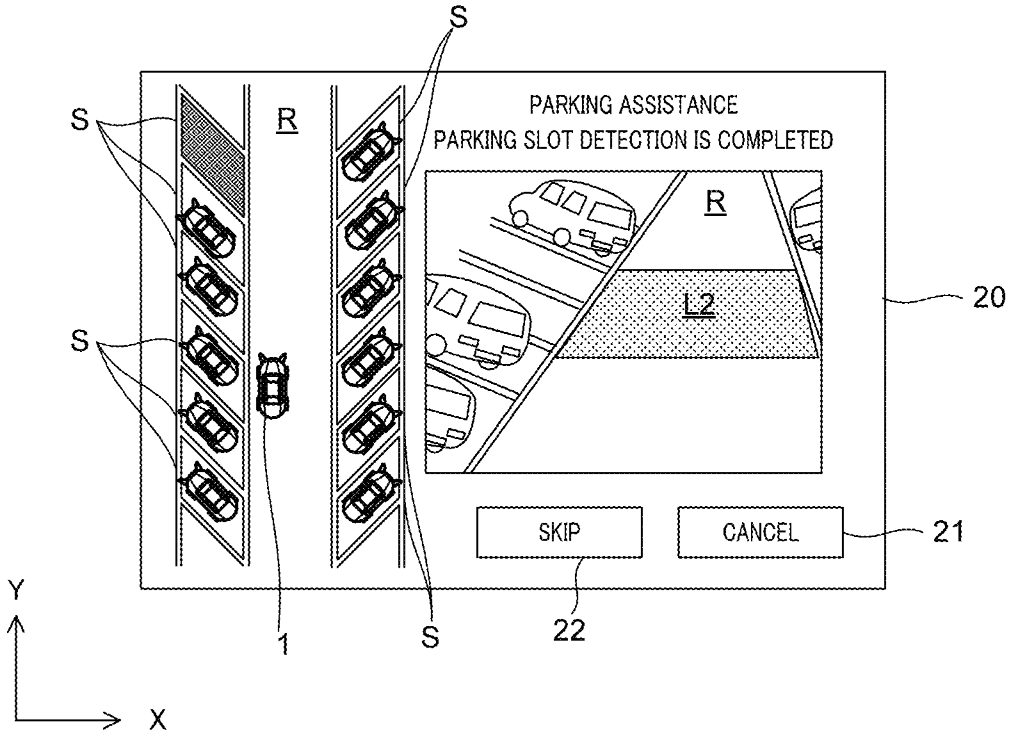
FIG. 13 illustrates still another exemplary display of the HMI apparatus during parking assistance control.

Incidentally, when a parking slot line has a width corresponding to a plurality of parking slots, two or more parking slots adjacent to each other in the Y direction and a parking slot line possibly overlap with each other as illustrated in FIG. 13. In this case, for example, even though the occupant desires to park the parking slot on the rear side, parking slot detector 160 possibly detects the parking slot on the front side first and recognizes the parking slot as a target parking slot. FIG. 13 illustrates an example in which the color of the detected parking slot at the front is changed to be distinguished from the other parking slots in the overhead view image.

At this time, display image generator 190 may display a selection screen on HMI apparatus 20 regarding whether the occupant to skip the detected parking slot.

FIG. 13 illustrates an example in which operation button 22 for skipping the automatic parking to the designated parking slot is displayed on HMI apparatus 20.

When the occupant presses operation button 22, parking assistance apparatus 100 deletes the detected parking slot and sets another parking slot detected within the designated range (range with reference to parking slot line L) as a parking slot targeted for parking.

This makes it possible to park vehicle 1 in the parking slot in which the occupant desires to park. Further, expanding the range of the parking slot line leaves much operation time for the occupant to give a parking instruction.

Furthermore, in the above-described embodiment, the parking slot line is superimposed and displayed on the display image of HMI apparatus 20, but the present disclosure is not limited thereto, and the parking slot line need not be superimposed and displayed on the display image. In this case, the occupant gives a parking instruction in his/her own sense. Parking assistance apparatus 100 operates while regarding a range away from the vehicle position at the time of the parking instruction by a predetermined distance in the forward direction as a target for detecting a parking slot.

In the above embodiment, the display images are displayed on the display screen of HMI apparatus 20, but the present disclosure is not limited thereto. For example, the display images may be displayed on a display audio, a display in a meter panel, or a head-up display.

In the above-described embodiment, a parking slot line is displayed on a display unit such as HMI apparatus 20, but the present disclosure is not limited thereto. For example, the display of the parking slot line may be projected on a road surface in front of vehicle 1. That is, parking assistance apparatus 100 may include a projection unit that projects a parking slot line on a road surface in front of the vehicle. The projection unit may be, for example, a lighting device such as a courtesy lamp provided in vehicle 1.

In this way, the occupant can give a parking instruction while looking at the road surface in front of vehicle 1 without looking at the display screen of a display unit.

Further, in the above-described embodiment, a parking slot line is displayed until designation of a parking slot is performed after parking assistance control is started, but parking assistance apparatus 100 may be configured, as a safety mechanism, not to display a parking slot line and not to receive a parking instruction unless a predetermined condition (e.g., the speed of vehicle 1 is slower than or equal to a certain speed) is satisfied. That is, parking assistance apparatus 100 may include a switching unit that switches between display and non-display of a parking slot line depending on the speed of vehicle 1.

Further, in the above-described embodiment, either of the parking slots on the right and left sides of passage R is designated by the direction indicator, but the present disclosure is not limited thereto. For example, it may be predetermined which parking slot on the right or left side of passage R to be designated. For example, the right and left selection buttons may be displayed on the display screen, and which parking slot on the right or left side to be designated may be set by the occupant selecting either one of the right and left in advance. Further, for example, the right and left selection switch may be provided to vehicle 1, and the occupant may push the either switch in advance to determine which parking slot on the right or left side to designate. Furthermore, the right and left selection switch may be switches separated for right and left, a single switch whose left, middle (no right/left designation), or right side is pushed, a dial switch, or the like.

In addition, parking assistance apparatus 100 may autonomously select one of the right and left parking slots. As an example of the autonomous selection, from the right and left parking slots, a detected parking slot may be selected. Further, either one of the right and left parking slots may be selected depending on the position of the vehicle. For example, from the right and left parking slots, a parking slot closer to vehicle 1 may be selected.

Further, in the above embodiment, a case is not particularly mentioned where a plurality of parking slots corresponding to the position of the designated parking slot (parking slot line) is detected, but a parking slot may be selected in accordance with a preset priority, for example. Furthermore, as in the above-described embodiment illustrated in FIG. 13, it may be configured to skip the parking slot selected by parking assistance apparatus 100 by the user operation.

Further, in the above-described embodiment, the operation based on the parking instruction and the operation at the time of making a right or left turn both performed by the direction indicator are not distinguished from each other, but the present disclosure is not limited thereto, and parking assistance apparatus 100 may distinguish these operations. That is, instruction detector 120 may determine whether the operation of the direction indicator is an operation indicating a parking instruction or an operation performed when the vehicle turns right or left.

The case where it is determined that the operation of the direction indicator is an operation performed when the vehicle turns right or left may be a case where a steering operation is detected together with the operation of the direction indicator. At this point, it may be determined that the operation is the operation of turning the vehicle right or left based on the amount of change in steering, or it may be determined that the operation is the operation of turning the vehicle right or left based on the amount of change in the direction of vehicle 1.

Further, in the above-described embodiment, the inclination of a passage on which vehicle 1 travels is not particularly mentioned. Since the position of the parking slot in the image by the camera varies depending on the inclination of the passage, it is necessary to display the parking slot line in consideration of the inclination of the passage. That is, parking assistance apparatus 100 may include a correction unit that corrects the position of the parking slot line depending on the inclination of the passage.

In this configuration, for example, a vehicle inclination detector for detecting the inclination of the road surface in the front and rear direction of vehicle 1 may be provided.

Further, in the above-described embodiment, vehicle 1 travels by the operation by the occupant in the parking slot detection mode, but the present disclosure is not limited thereto, and vehicle 1 may automatically travel in the parking slot detection mode.

Further, in FIGS. 6 to 13, a white line, a parking slot line, and the like on the display image are all straight lines, but the present disclosure is not limited thereto, and the white line, the parking slot line, and the like on the display image may curve. When a camera equipped with a fisheye lens is used, a straight line appears to curve in a camera image, and thus a parking slot line and the like in consideration of the curve caused in such a camera image may be displayed as a display image.

The contents illustrated in FIGS. 6 to 13 indicate exemplary images. Since the appearance of the image varies depending on the position of the camera, the contents of FIGS. 6 to 13 may vary depending on the vehicle.

The above-described embodiments are no more than specific examples in carrying out the present disclosure, and the technical scope of the present disclosure is not to be construed in a limitative sense due to the specific examples. That is, the present disclosure can be implemented in various forms without departing from the spirit and the main features thereof.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2023-091045, filed on Jun. 1, 2023, the disclosure of which including the specification, drawings and abstract is incorporated herein by reference in its entirety.

INDUSTRIAL APPLICABILITY

The apparatus of the present disclosure is useful as a parking assistance apparatus and a parking assistance method each capable of smoothly performing automatic parking in a short time.

The invention claimed is:

1. A parking assistance apparatus for a vehicle, the parking assistance apparatus comprising:

an input configured to be coupled with a camera and a human-machine interface device, the camera being configured to capture an ambient image of ambient area of the vehicle, the human-machine interface device being configured to receive at least a parking instruction of an occupant of the vehicle; and an output configured to be coupled with the human-machine interface device and a vehicle control device, the human-machine interface device being configured to output at least one of an image or a sound, the vehicle control device being configured to control at least a steering angle and a speed of the vehicle, wherein while the parking assistance apparatus does not detect a parking slot based on the ambient image, the parking assistance apparatus outputs a guide image overlapping the ambient image using the human-machine interface device, the guide image including an indicator, the parking assistance apparatus stores a target parking slot corresponding to the indicator on the ambient image in response to receiving the parking instruction of the occupant using the human-machine interface device, and the parking assistance apparatus sets the vehicle control device to perform an automatic parking of the vehicle to the target parking slot after the parking assistance apparatus detects the target parking slot based on the ambient image.

2. The parking assistance apparatus according to claim 1, wherein the indicator of the guide image comprises a line overlapping the ambient image.

3. The parking assistance apparatus according to claim 1, wherein the parking assistance apparatus corrects a position of the indicator in a screen of a display of the human-machine interface device, depending on a speed of the vehicle.

4. The parking assistance apparatus according to claim 1, wherein the parking assistance apparatus corrects a position of the indicator in a screen of a display of the human-machine interface device, depending on an inclination of the vehicle in a front and rear direction.

5. The parking assistance apparatus according to claim 1, wherein the parking assistance apparatus outputs the guide image including the indicator when a traveling speed of the vehicle is less than a predetermined speed.

6. The parking assistance apparatus according to claim 1, wherein the parking assistance apparatus does not receive the parking instruction of the occupant using the human-machine interface device when a traveling speed of the vehicle is greater than a predetermined speed.

7. The parking assistance apparatus according to claim 1, wherein the parking assistance apparatus starts waiting for the parking instruction of the occupant after an instruction of starting parking assistance by the occupant is detected.

8. The parking assistance apparatus according to claim 7, wherein the parking assistance apparatus stops waiting for the parking instruction of the occupant when a number of times which the parking instruction is received is greater than a predetermined number.

9. The parking assistance apparatus according to claim 7, wherein the parking assistance apparatus stops waiting for the parking instruction of the occupant when the vehicle travels a predetermined distance after the parking assistance apparatus starts waiting for the parking instruction of the occupant.

10. The parking assistance apparatus according to claim 7, wherein the parking assistance apparatus stops waiting for the parking instruction of the occupant when a predetermined time elapses after the parking assistance apparatus starts waiting for the parking instruction of the occupant.

11. The parking assistance apparatus according to claim 7, wherein the parking instruction of the occupant is an operation of a direction indicator by the occupant.

12. The parking assistance apparatus according to claim 11, wherein the parking assistance apparatus determines whether the operation of the direction indicator is a first operation indicating the parking instruction or a second operation involving a right or left turn of the vehicle.

13. The parking assistance apparatus according to claim 1, wherein the human-machine interface device includes a screen of a display, the screen being configured to display the guide image overlapping the ambient image.

14. A parking assistance apparatus for a vehicle, the parking assistance apparatus comprising:

an input configured to be coupled with a camera and a human-machine interface device, the camera being configured to capture an ambient image of ambient area of the vehicle, the human-machine interface device being configured to receive at least a parking instruction of an occupant of the vehicle; and an output configured to be coupled with the human-machine interface device and a vehicle control device, the human-machine interface device being configured to output at least one of an image or a sound, the vehicle control device being configured to control at least a steering angle and a speed of the vehicle, wherein while the parking assistance apparatus does not detect a parking slot based on the ambient image, the parking assistance apparatus outputs a guide image using the human-machine interface device, the guide image including an indicator, the parking assistance apparatus stores a target parking slot corresponding to the indicator in response to receiving the parking instruction of the occupant using the human-machine interface device, and the parking assistance apparatus sets the vehicle control device to perform an automatic parking of the vehicle to the target parking slot after the parking assistance apparatus detects the target parking slot based on the ambient image.

15. The parking assistance apparatus according to claim 14, wherein the parking assistance apparatus projects the guide image including the indicator on a road surface in front of the vehicle.

16. The parking assistance apparatus according to claim 15, wherein the parking assistance apparatus outputs the guide image including the indicator using a head-up display of the vehicle.

17. The parking assistance apparatus according to claim 15, wherein the parking assistance apparatus outputs the guide image including the indicator when a traveling speed of the vehicle is less than a predetermined speed.

18. A parking assistance apparatus for a vehicle, the parking assistance apparatus comprising:

an input configured to be coupled with a camera and a human-machine interface device, the camera being configured to capture an ambient image of ambient area of the vehicle, the human-machine interface device being configured to receive at least a parking instruction of an occupant of the vehicle; and an output configured to be coupled with a vehicle control device, the vehicle control device being configured to control at least a steering angle and a speed of the vehicle, wherein while the parking assistance apparatus does not detect a parking slot based on the ambient image, the parking assistance apparatus stores a target parking slot corresponding to an indicator in response to receiving the parking instruction of the occupant using the human-machine interface device, and the parking assistance apparatus sets the vehicle control device to perform an automatic parking of the vehicle to the target parking slot after the parking assistance apparatus detects the target parking slot based on the ambient image.

19. The parking assistance apparatus according to claim 18, wherein the vehicle comprises the indicator as a part of a body of the vehicle.

* * * * *